No. 781,307. PATENTED JAN. 31, 1905.
C. SCHMIDT.
TRANSMISSION GEARING FOR MOTOR VEHICLES.
APPLICATION FILED JUNE 22, 1903.
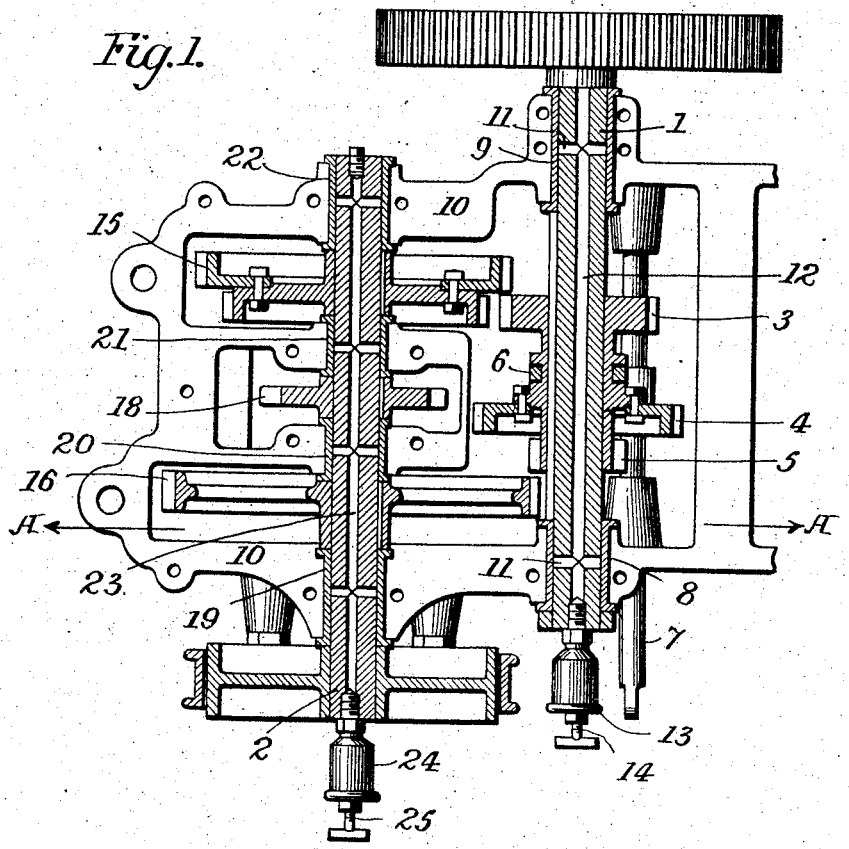
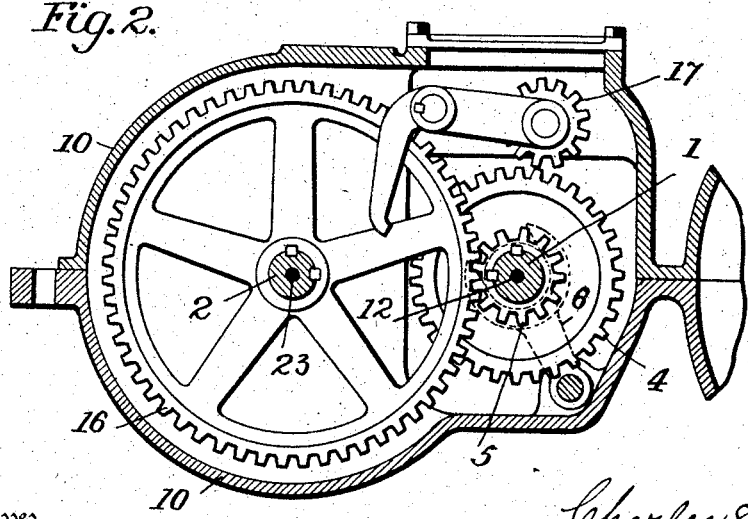

No. 781,307. Patented January 31, 1905.

UNITED STATES PATENT OFFICE.

CHARLES SCHMIDT, OF WARREN, OHIO, ASSIGNOR TO THE PACKARD MOTOR CAR COMPANY, OF WARREN, OHIO, A CORPORATION OF WEST VIRGINIA.

TRANSMISSION-GEARING FOR MOTOR-VEHICLES.

SPECIFICATION forming part of Letters Patent No. 781,307, dated January 31, 1905.

Application filed June 22, 1903. Serial No. 162,630.

*To all whom it may concern:*

Be it known that I, CHARLES SCHMIDT, a citizen of France, residing at Warren, in the county of Trumbull and State of Ohio, have invented certain new and useful Improvements in Transmission-Gearing for Motor-Vehicles, of which the following is a specification.

The present invention relates particularly to the manner of mounting and lubricating the shafts of the transmission-gearing used in changing speed and in reversing the movement of motor-vehicles.

The invention will be described with reference to the accompanying drawings, in which—

Figure 1 is a plan view of the lower half of the gear-case, the gearing being shown in horizontal section; and Fig. 2 is a vertical section about on the line A A of Fig. 1.

Referring to the drawings, 1 indicates a power-driven shaft, which may be either the motor-shaft or one directly driven by it, and 2 indicates the counter-shaft. On the shaft 1 is a hub or sleeve carrying gears 3 4 5, said sleeve turning with and sliding on said shaft. The sleeve also has an annular groove in which is engaged a yoke 6, connected to a sliding rod 7. By moving rod 7 the gears may be shifted along shaft 1 to engage the several gears of the counter-shaft. The shaft 1 is mounted in bearings 8 and 9 in the casing 10, and these bearings are lubricated by transverse ducts 11, communicating with the central duct 12 in shaft 1. The duct 12 is closed at one end, and it communicates at the other end with an oil or grease cup 13. The oil or grease is forced in through the ducts of the bearings by a piston operated by a piston-rod 14, which may be screw-threaded and engage with threads in the end of the cup.

The counter-shaft 2 carries near one end a double spur-gear 15, adapted to engage with the gears 3 and 4, and toward its other end it carries a single spur-gear 16, adapted to engage with the gear 5. The gears are all disconnected simultaneously when in the position shown in Fig. 1. When in this position, the backing-gear 17 may be used to connect the gears 5 and 16 to effect a slow reverse movement of the counter-shaft. The counter-shaft is provided with bearings on each side of each gear and on each side of the sprocket-wheel 18, which communicates power to the driving-wheels of the vehicle. These bearings are all supported in the casing 10 and arranged between the upper and lower halves thereof. By supporting the counter-shaft close to each side of each gear and the sprocket-wheel all bending strain in said shaft is obviated, and consequently the shaft may be turned with less power and there is much less wear on the bearings than in cases where the shaft is simply supported at its ends, as heretofore. The bearings being all in the single casting prevents them from getting out of alinement.

The respective bearings for the shaft 1 are indicated by the numerals 19, 20, 21, and 22. These bearings are lubricated through transverse ducts in the shaft 1 communicating with the central duct 23, which is supplied by a grease-cup 24, having a piston and piston-rod 25, similar to the grease-cup 13, before described. By forcing in the piston 25 the bearings will be simultaneously supplied with a lubricant.

It will be seen that by means of the foregoing invention the counter-shaft is supported on each side of each point at which strain is applied to it and that in this manner its alinement is preserved, wear and tear of the bearings prevented, and the power required to drive it reduced to a minimum.

Having described my invention, what I claim, and desire to secure by Letters Patent, is—

1. In a motor-vehicle, the combination of a shaft, a sprocket-wheel centrally located on said shaft, gears upon each side of said sprocket-wheel for turning the shaft, and a casing having bearings for said shaft between the sprocket-wheel and the gears, and other bearings outside of said gears, for the purpose set forth.

2. In a motor-vehicle, the combination with a casing consisting of upper and lower sections, of a power-shaft mounted in bearings in the casing, a plurality of gears on said shaft, a counter-shaft, a sprocket-wheel centrally located on said counter-shaft, gears on opposite sides of said sprocket-wheel, bearings between the sprocket-wheel and the gears and bearings for the shaft outside of the gears, all of said bearings being rigidly supported in the casing, whereby they are kept in perfect alinement.

In testimony whereof I have signed my name to this specification in the presence of two subscribing witnesses.

CHARLES SCHMIDT.

Witnesses:
RUSSELL HUFF,
H. V. BATCHELLER.